US012801264B2

(12) United States Patent
Shaw et al.

(10) Patent No.: US 12,801,264 B2
(45) Date of Patent: Nov. 17, 2026

(54) SYSTEM AND METHOD FOR CREATING AN ENGINEERING COMPLIANT NAMING SYSTEM

(71) Applicant: Hexagon Technology Center GmbH, Heerbrugg (CH)

(72) Inventors: Scott David Shaw, Stockley (GB); Jack Llewellyn Cockerell, Kemble (GB)

(73) Assignee: Hexagon Technology Center GmbH, Heerbrugg (CH)

( * ) Notice: Subject to any disclaimer, the term of this patent is extended or adjusted under 35 U.S.C. 154(b) by 132 days.

(21) Appl. No.: 18/894,994

(22) Filed: Sep. 24, 2024

(65) Prior Publication Data

US 2026/0086698 A1 Mar. 26, 2026

(51) Int. Cl.

| | |
|---|---|
| ***G06F 3/00*** | (2006.01) |
| ***G06F 3/0482*** | (2013.01) |
| ***G06F 3/0484*** | (2022.01) |
| ***G06F 40/106*** | (2020.01) |
| ***G06F 40/186*** | (2020.01) |
| *G06F 3/01* | (2006.01) |

(52) U.S. Cl.
CPC .......... *G06F 3/0484* (2013.01); *G06F 3/0482* (2013.01); *G06F 40/106* (2020.01); *G06F 40/186* (2020.01)

(58) Field of Classification Search
None
See application file for complete search history.

(56) References Cited

U.S. PATENT DOCUMENTS

| | | | | |
|---|---|---|---|---|
| 7,272,646 | B2 * | 9/2007 | Cooper | H04L 41/069 714/39 |
| 8,019,633 | B2 * | 9/2011 | Stroman | G06Q 30/00 705/7.11 |
| 9,852,257 | B1 * | 12/2017 | Chavva | G06F 30/392 |
| 2019/0222589 | A1 * | 7/2019 | Kislitsin | H04L 63/0236 |
| 2020/0374106 | A1 * | 11/2020 | Padmanabhan | G06F 21/64 |
| 2022/0087644 | A1 * | 3/2022 | Patil | A61B 8/08 |
| 2022/0100570 | A1 * | 3/2022 | Shang | G06F 16/9566 |
| 2022/0292572 | A1 * | 9/2022 | Zhang | G06Q 30/0201 |
| 2023/0418828 | A1 * | 12/2023 | Shaw | G06F 16/2445 |

* cited by examiner

*Primary Examiner* — Toan H Vu
(74) *Attorney, Agent, or Firm* — Nutter McClennen & Fish LLP

(57) ABSTRACT

Illustrative embodiments generate an architect graphical user interface, which architect graphical user interface enables a template architect to generate a template from which a protocol-compliant name can be generated, even though the template architect lacks a deep understanding of the protocol.

20 Claims, 12 Drawing Sheets

SYSTEM AND METHOD FOR CREATING AN ENGINEERING COMPLIANT NAMING SYSTEM

FIELD

Illustrative embodiments of the invention generally relate to computer systems and, more particularly, various embodiments of the invention relate to graphical user interfaces.

BACKGROUND

Many organizations have naming protocols for aspects of the organization's property and projects. Such naming protocols seek to assure that everyone in the organization uses a common terminology format so that each name provides specified information about an item.

For example, an organization having a computer network may have a naming protocol for each item of computer hardware in the network, and each item of software used in the network. Names that comply with such a protocol are protocol-compliant, and facilitate locating corporate (e.g., hardware) assets when they need to be repaired, updated or replaced, and facilitate locating software assets that need to be deleted, updated or replaced. Protocol compliant names also help ensure that each asset can be unambiguously identified for security purposes.

Some protocols also specify that names must convey information about the asset, such as its type, the sub-network to which it belongs, or its primary user.

One example of a name format might be specified by a naming protocol to include the following fields: [Company Initials]-[Location]-[Department]-[Year]-[Serial Number]. For example, a laptop having serial number 5876 and assigned to the human resources department ("HR") in the Dallas, Texas ("DTx") office of Tyrol Corporation ("TC"), purchased in 2022, might be named "TC-DTx-HR-22-5876". Some protocols allow optional fields. In keeping with the foregoing example, if the Tyrol Corporation naming protocol allows a name to (optionally) include an identifier of an operating system of a computer asset, the name might be "TC-DTx-HR-22-5876*W9.75" where "W9.75" identifies the operating system.

Consequently, typical naming protocols define and enforce content and structure for each name. Such structure may include, for example, a combination of meaningful abbreviations, numbers, codes, and/or special characters.

Typical naming protocols are complex and include minimum content requirement, ordering of the required content within the name, and syntax.

Moreover, many organizations have their own unique naming protocol that is not used by any other organization. Further, some organizations have a plurality of distinct naming protocols, such as a naming protocol for each division of the organization.

Consequently, creation of a protocol-compliant name requires a user to have detailed knowledge of the organization's protocol and its complex syntax and other details. That may be an insurmountable burden for some users, such as users who are new to the company, users who are inexperienced with the use of computers, and users who are not familiar with the complex naming protocol, and/or who do not understand concepts of syntax.

SUMMARY OF VARIOUS EMBODIMENTS

In accordance with one embodiment of the invention, a computer-implemented method of creating an engineering name template for guiding a user to produce an engineering name, which engineering name complies with a specific engineering name protocol, includes:

obtaining metadata describing both content and syntax of a plurality of name segments of a multi-segment name, which content and syntax is specified by the specific engineering name protocol;

customizing a graphical user interface to create a customized graphical user interface by populating a set of graphical input devices within the graphical user interface with the metadata, such that the customized graphical user interface is configured to solicit operator input data to develop an engineering name template;

receiving operator input data via the customized graphical user interface; and generating the engineering name template as specified by the operator input data, which engineering name template is configured to solicit information from a user that, when populated into the engineering name template, produces an engineering name that complies with the specified engineering name protocol.

In some embodiments, the metadata includes specification of the plurality of name segments, and the order of each such name segment within the engineering name template; and the graphical user interface includes a plurality of graphical input devices, each such graphical input device corresponding to a corresponding name segment from the plurality of name segments; and customizing a graphical user interface comprises arranging the graphical input devices in the order of said name segments within the engineering name template.

In some embodiments, the metadata includes specification of the plurality of name segments, a specified order of each such name segment within the engineering name template; and syntax elements coupling the name segments in the specified order. In such embodiment, the graphical user interface includes a plurality of graphical input devices, each such graphical input device corresponding to a corresponding name segment from the plurality of name segments; and customizing a graphical user interface includes arranging the graphical input devices and the syntax elements in the specified order within the engineering name template.

In some embodiments, the engineering name template is in the form of text.

In some embodiments, the metadata specifies a set of options for each segment of the name segment; and each name segment of the engineering name template is in the form of a corresponding drop-down menu, which drop-down menu presents options for said name segment, which options are specified by the metadata.

In some embodiments, the metadata specifies a set of optional name segments; and customizing a graphical user interface comprises configuring to the customized graphical user interface to display optional name segments.

In some embodiments, the metadata specifies a plurality of name segments, for which content may be specified by a user; and the metadata specifies a set of syntax elements for which content may not be changed by a user; and customizing the graphical user interface comprises configuring to the customized graphical user interface to configure provide name segments such that content of said name segments may be specified by a user.

Another embodiment includes an apparatus for creating an engineering name template for guiding a user to produce an engineering name, which engineering name complies with a specific engineering name protocol. In a first embodiment, such a system includes:

a metadata module configured to obtain metadata describing both content and syntax of a plurality of name segments of a multi-segment name, which content and syntax is specified by the specific engineering name protocol;

a graphical user interface module configured to customize a graphical user interface by populating a set of graphical input devices within the graphical user interface with the metadata, such that the graphical user interface is configured to solicit and receive operator input data to develop an engineering name template;

an operator input module configured to receive operator input data via the graphical user interface; and a template generating module configured to generate the engineering name template pursuant to the operator input data, which engineering name template is configured to solicit information from a user that, when populated into the engineering name template, produces an engineering name that complies with the specified engineering name protocol.

In some embodiments, the metadata includes specification of the plurality of name segments, and the order of each such name segment within the engineering name template; and the graphical user interface module is configured to customize the graphical user interface by arranging the set of graphical input devices to correspond with the order of the name segments within the engineering name template.

In some embodiments, wherein the metadata includes: specification of the plurality of name segments, a specified order of each such name segment within the engineering name template, and syntax coupling the name segments in the specified order; and the graphical user interface module is configured to customize the graphical user interface by arranging the set of graphical input devices to correspond with the order of the name segments within the engineering name template along with syntax coupling the name segments in the specified order.

In some embodiments, the metadata specifies a set of options for each segment of the name segment; and the graphical user interface module is configured to customize the graphical user interface to present each name segment of the engineering name template in the form of a corresponding drop-down menu, which drop-down menu presents options for said name segment, which options are specified by the metadata.

In some embodiments, the metadata specifies a set of optional name segments, and the graphical user interface module is configured to customize the graphical user interface to display each optional name segment in response to operator input data.

In some embodiments, the metadata specifies a plurality of name segments, for which content may be specified by a user; and the metadata specifies a set of fixed syntax elements for which content may not be changed by a user; and the graphical user interface module is configured to customize the graphical user interface to display the plurality of name segments and the set of fixed syntax elements in an order specified by the metadata.

Yet another embodiments includes a non-transitory computer-readable medium having computer executable code thereon, the computer executable code, when executed by a computer system, causing the computer system to perform a method. The code includes:

code for obtaining metadata describing both content and syntax of a plurality of name segments of a multi-segment name, which content and syntax is specified by the specific engineering name protocol;

code for customizing a graphical user interface to create a customized graphical user interface by populating a set of graphical input devices within the graphical user interface with the metadata, such that the graphical user interface is configured to solicit and receive operator input data to develop an engineering name template;

code for displaying the customized graphical user interface on a computer display;

code for receiving operator input data via the graphical user interface; and code for generating the engineering name template pursuant to the operator input data, which engineering name template is configured to solicit information from a user that, when populated into the engineering name template, produces an engineering name that complies with the specified engineering name protocol.

In some embodiments, the metadata includes specification of the plurality of name segments, and the order of each such name segment within the engineering name template; and the code for customizing a graphical user interface comprises code for graphically arranging the set of graphical input devices to correspond with the order of the name segments within the engineering name template.

In some embodiments, the metadata includes: specification of the plurality of name segments, a specified order of each such name segment within the engineering name template, and syntax coupling the name segments in the specified order; and the code for customizing a graphical user interface comprises code for customizing the graphical user interface by arranging the set of graphical input devices to correspond with the order of the name segments within the engineering name template along with syntax coupling the name segments in the specified order.

In some embodiments, the metadata includes: a set of options for each segment of the name segment; and the code for customizing a graphical user interface comprises code for displaying each name segment of the engineering name template in the form of a corresponding drop-down menu, which drop-down menu presents options for said name segment, which options are specified by the metadata.

In some embodiments, the metadata includes specification of a set of optional name segments; and the code for customizing a graphical user interface includes code for customizing the graphical user interface to display each optional name segment in response to operator input data.

In some embodiments, the metadata includes: a plurality of name segments, for which content may be specified by a user, and a set of fixed syntax elements for which content may not be changed by a user; and the code for customizing a graphical user interface comprises code for customizing the graphical user interface to display the plurality of name segments and the set of fixed syntax elements in an order specified by the metadata.

In some embodiments, the code further includes: code for causing display, on a computer screen, a preview of the template.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
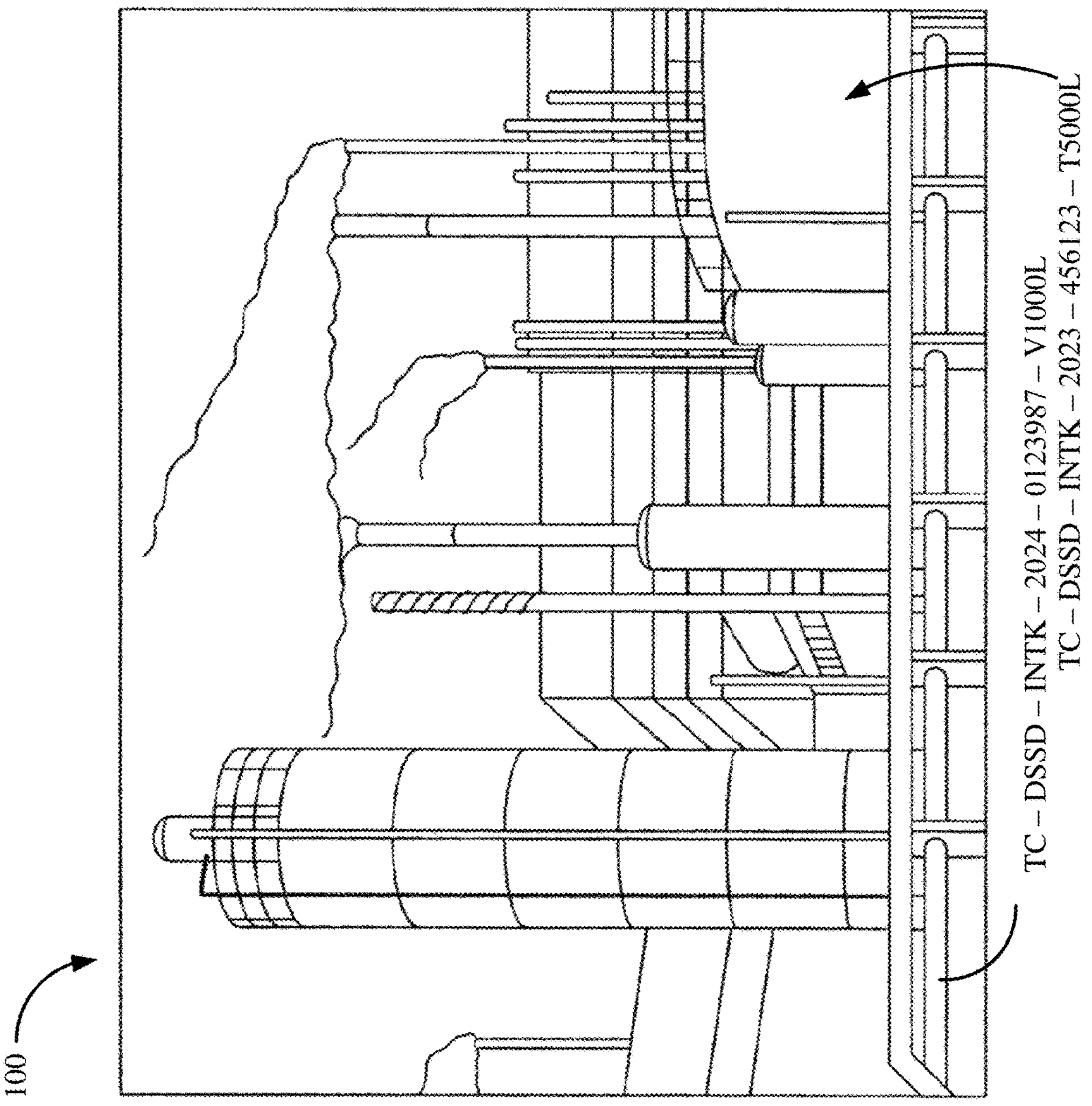
FIG. 1 schematically illustrates a physical plant.

Illustrative embodiments generate an architect graphical user interface, which architect graphical user interface enables a template architect to generate a template from which a protocol-compliant name can be generated, even though the template architect lacks a deep understanding of the protocol.

Illustrative embodiments provide an intuitive approach to helping the user create a protocol-compliant name template by allowing the user to create and add all required parts in one user interface, giving the user the freedom to drag and drop the parts in any order without having to start the process from scratch. Further, illustrative embodiments help with the technical complexity of creating a template and give the user freedom to move each added part around without the need to remove or start again.

Rather than requiring a person to manually express all of the 'parts' of a template, the exact order of each part and the type of delimiter needed to join each part together, illustrative embodiment provide a simple, step by step user interface that hides the technical complexity of building a template and enables the user to focus on how the template is structured.

For example, illustrative embodiments provide one or more of the following:

- a drop-down menu to pick 'pre-existing' parts to add to a template;
- a text box configured to accept free-form text input from a user;
- the ability to create a new 'part' from a drop-down menu;
- the ability to set individual parts as 'optional', allowing flexibility in the template;
- drag-and-droppable parts that allow the person to quickly move around the parts to structure or restructure a template;
- the ability to preview the template during construction, and in some embodiments to highlight any parts that have been marked as 'optional'
- the ability to 'click' on a particular part in the 'preview' which in turn will highlight the given part;
- a drop-down menu to select the desired 'delimiter' between two tag-naming parts.

Some embodiments also include micro-prompts, help options and links so if at any point the user is unsure of what to complete then help is never far away. Active validation automatically ensures that each constituent part of the template is validated preventing any opportunity for user error.

Illustrative embodiments provide one or more improvements over methods to create a protocol-compliant name, and over methods and systems for creating a template for creating a protocol-compliant engineering name. For example, some illustrative embodiments address issues arising in creation of an engineering name that complies with a complex set of engineering naming system requirements from an engineering naming system protocol. Also, some illustrative embodiments address issues arising in creation of an engineering name template, which engineering name template is configured to assist a user in creating a protocol-compliant engineering name.

Moreover, illustrative embodiments make creating protocol-compliant names, and engineering name templates, available to non-technical users without requiring such users to learn the complex syntax and other details of the protocol.

Such benefits are particularly valuable in situations in which an engineering name protocol (with which each engineering name must comply) is subject to change. A graphical user interface can be programmed to present a form that allows a user to create a protocol-compliant name by filling in blanks of the form. However, if the protocol changes (e.g., is updated), such a graphical user interface must be reprogrammed, at substantial time and cost, and requiring technical expertise relating to the protocol.

In contrast, illustrative embodiments present to a user a graphical user interface that is defined according to a specific engineering name protocol, and specifically pursuant to metadata corresponding to that specific engineering name protocol. In that way, a graphical user interface can guide a user to create a template for a protocol-compliant engineering name, by being generated pursuant to metadata corresponding to a new (or updated) specific engineering name protocol. Consequently, to update a graphical user interface 500, only the metadata is updated to include changes to the specific engineering name protocol, and the graphical user interface 500 will change to match.

Details of illustrative embodiments are discussed below.

Definitions: As used in this description and the accompanying claims, the following terms shall have the meanings indicated, unless the context otherwise requires.

The term "graphical user interface" (or "GUI") means a form of computer-user interface that allows users to interact with a computer at least in part through graphical devices displayed on a computer display screen. Examples of graphical devices may include a graphical icon, a menu (including a drop-down menu), a window, and a pane, to name but a few examples. A data entry area (e.g., a rectangle) that is associated with another graphical device and that is configured to receive alpha-numeric input from a user (e.g., where the alpha-numeric input is solicited by such other graphical device) is also an example of a graphical device. A command-line, and a text editor, without more, is not a graphical user interface.

A "module" of a system may be implemented by a computer system executing code that causes the computer system to perform a function.

A "protocol" relative to an engineering name means is a standard that specifies content (and in some embodiments, delimiters) of a name used in engineering documents. An engineering name that complies with a given protocol may be referred-to as a "protocol-compliant" name for that protocol. A protocol typically specifies a plurality of components for an engineering name, including for example a plurality of tag name segments, each pair of name segments separate from one another by a delimiter.

A "protocol architect" for a given protocol is a person who is familiar with the protocol and who is able to design an engineering name that is compliant with the protocol, and/or metadata configured to customize a graphical user interface for creation of an engineering name template configured to enable a user to produce an protocol-compliant name.

A "set" includes at least one member. Unless otherwise specified, a set may include as few as a single member, or may include a plurality of members. For example, unless otherwise specified: a set of parameters may include a single parameter or a plurality of parameters; a set of records may include a single record or a plurality of records, etc.

A "tag" is a protocol-compliant engineering name.

FIG. 1 schematically illustrates an engineering drawing of a portion of a physical plant 100 having a plurality of features, including pipes, tanks and valves. The physical plant 100 may be a desalination plant, a pump station, or a refinery, to name but a few examples.

Each feature may have an associated engineering name. For example, a name format for a valve in a plant (e.g., a desalinization plant) in San Diego (DSSD) owned by Tyrol Corporation might be specified, by the Tyrol Corporation engineering name protocol, to include the following fields: [Company Initials]-[Plant Identifier]-[Area]-[Year]-[Serial Number]-[Capacity]. In FIG. 1, a valve with serial no. 0123987 having a capacity of 1000 liters/minute ("V1000L") installed in 2024 in the water intake area ("INTK") of that desalinization plant might be "TC-DSSD-INTK-2024-0123987-V1000L. A holding tank with serial no. 0456123 having a capacity of 5000 liters ("T5000L") installed in 2023 in the water intake area ("INTK") of that desalinization plant might be "TC-DSSD-INTK-2023-0456123-T5000L.

Figure 2A:
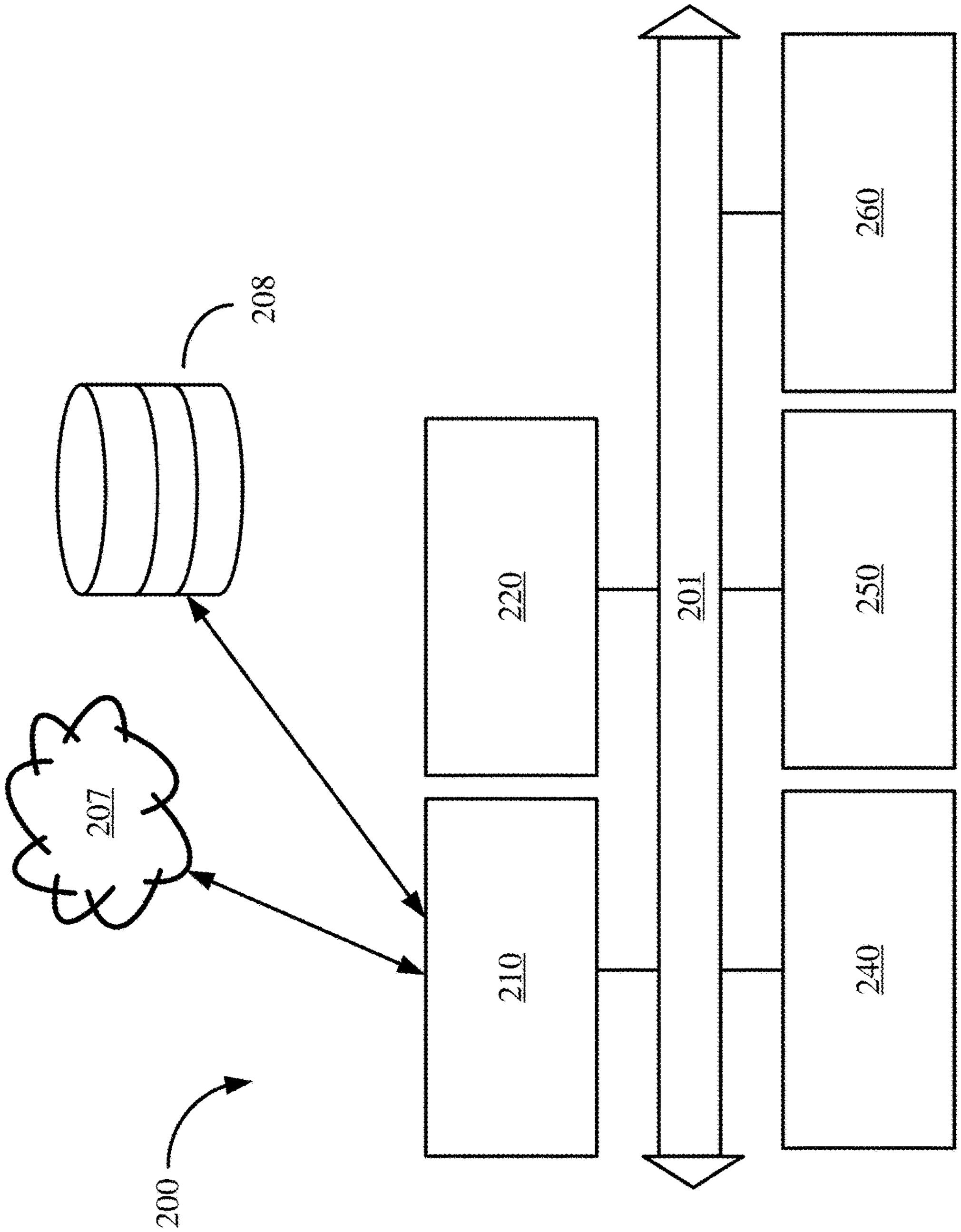
FIG. 2A schematically illustrates a system according to an illustrative embodiment.

FIG. 2A schematically illustrates an embodiment of a system 200 having a plurality of modules. The modules are each in communication with a communications interface 201, and may be in communication with one another over that communications interface 201.

The system 200 includes a communications module 210 configured to communication with other apparatuses, such as a communications network 207, and/or a database 208.

The system 200 also includes a memory module 220.

The system 200 also includes an engineering name generation module 240.

In some embodiments, the engineering name generation module 240 is configured to generate, based on user input, an engineering name template that complies with an engineering name format specified by a corresponding engineering name protocol. Such an engineering name template includes a plurality of engineering name segments (each of which may be referred-to as a "tag naming part") that are place-holders for information to be supplied later (e.g., by a user) to generate a engineering name that complies with the corresponding engineering name protocol. To that end, an engineering name template has both content and syntax, as specified by the corresponding engineering name protocol.

The system 200 also includes a display driver module 250 configured to cause a computer display (e.g., display 274) to display a desired image, or graphical user interface. Such a graphical user interface, in illustrative embodiments, may be configured by obtaining metadata describing both content and syntax of name segments of multi-segment names, which content and syntax is specified by the specific engineering name protocol. Such metadata may be obtained, for example, from a memory module 220, a database 208, or from a remote source across a network 207 (e.g., a remote source in a "cloud").

Figure 2B:
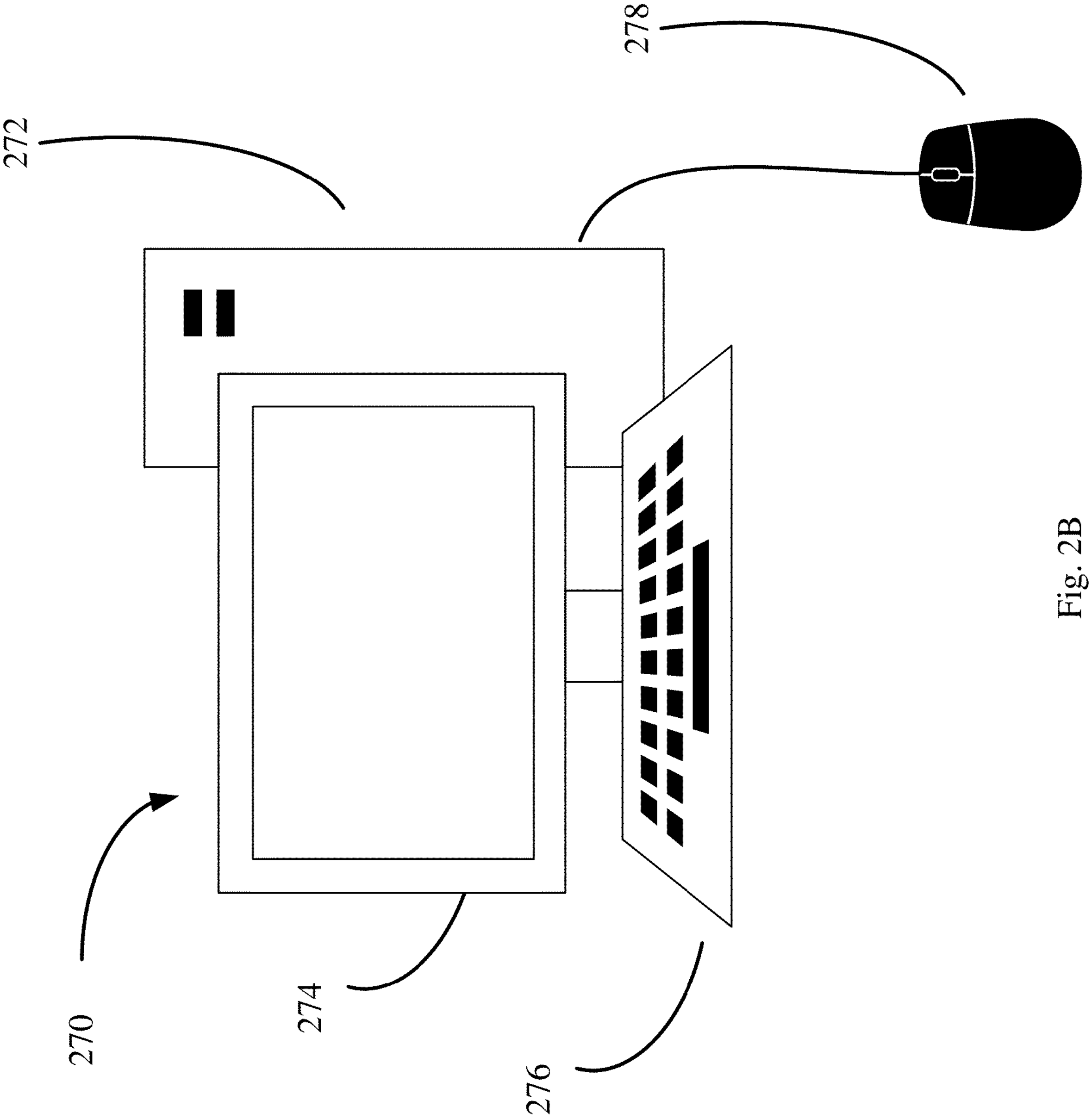
FIG. 2B schematically illustrates a computer according to an illustrative embodiment.

FIG. 2B schematically illustrates a computer 270 according to illustrative embodiments. The computer 270 may implement or include at least some of the modules of system 200. The computer 270 includes a processing unit 272 in electronic communication with a computer display having a display screen 274, and a computer keyboard 276, and a computer mouse 278.

Figure 2C:
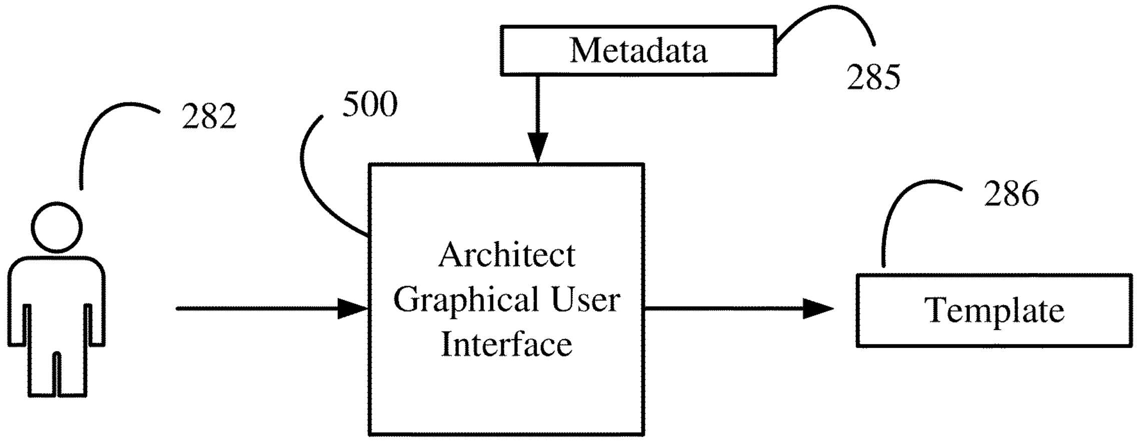
FIG. 2C schematically illustrates an embodiment of a graphical user interface.

Illustrative embodiments include an architect graphical user interface 500 configured to solicit and receive information from a template architect to create a template, as described herein. FIG. 2C schematically illustrates a template architect 282 using an architect graphical user interface 500. The output of the architect graphical user interface 500 is a template 286. The content and structure of the architect graphical user interface 500 is provided by metadata. In illustrative embodiments, the architect graphical user interface 500 is customized by (e.g., configured by) data from the metadata 285. The metadata 285 is created by a person familiar with the protocol (e.g., a protocol architect), so that the template 286 will be correctly configured to solicit and receive information to create a protocol-compliant engineering name.

Figure 2D:
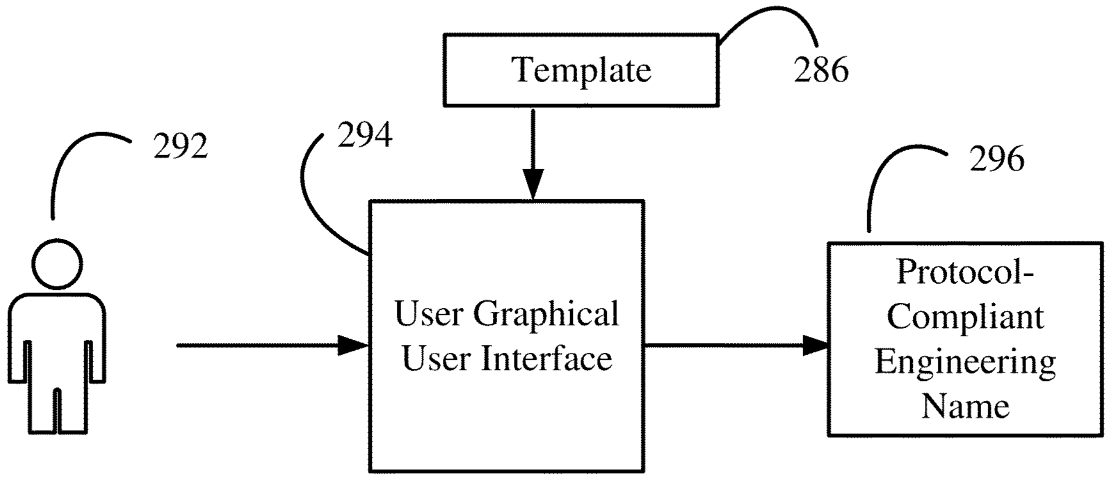
FIG. 2D schematically illustrates an embodiment of a graphical user interface as used by a user.

It should be noted that the template 206 is not a protocol-compliant engineering name. Rather, the template 206 is configured to solicit and receive from another user 292, information to create a protocol-compliant engineering name. To that end, FIG. 2D schematically illustrates a user (or end-user) 292 using the user graphical interface 294 to create a protocol-compliant engineering name 296. In illustrative embodiments, the user 292 may be a different person than the template architect 282.

Figure 3A:
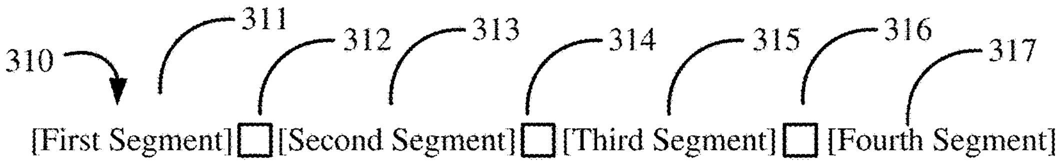
FIG. 3A schematically illustrates an embodiment of an engineering name format as specified by a corresponding engineering name protocol.

FIG. 3A schematically illustrates an embodiment of an engineering name template as 310 specified by a corresponding engineering name protocol. In this embodiment, the corresponding engineering name protocol specifies that the template has four name segments 311, 313, 315 and 317, and three syntax elements (or "delimiters") 312, 314 and 316.

A user 292 may create an engineering name that is compliant with the corresponding engineering name protocol by specifying values for each of the four name segments 311, 313, 315 and 317, and three syntax element 312, 314 and 316. A user may specify such values, for example, by use of a graphical user interface on a computer display.

Figure 3B:
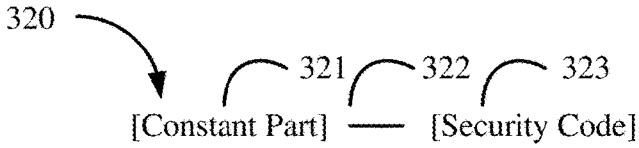
FIG. 3B schematically illustrates an embodiment of an engineering name template.

FIG. 3B schematically illustrates an embodiment of an engineering name template 320 that has been informed by its corresponding engineering name protocol to require only two segments 321, 323, and a single syntax element 322. In the embodiment of FIG. 3B, the corresponding engineering name protocol has specified that the first segment 311 is to have a specific value defined by the corresponding engineering name protocol. Some corresponding engineering name protocols require that each engineering name begins with the same data, which data may be referred-to as a "constant" part. In the embodiment of FIG. 3B, the corresponding engineering name protocol has specified that the second segment 323 must be a security code, which security code may be supplied by a user. In the embodiment of FIG. 3B, the corresponding engineering name protocol has specified that the syntax element 322 is a dash.

A user 292 can create an engineering name that is compliant with the corresponding engineering name protocol by specifying a security code that will combine in with the constant part 321 and the syntax element in the form as shown in FIG. 3B.

Figure 3C:
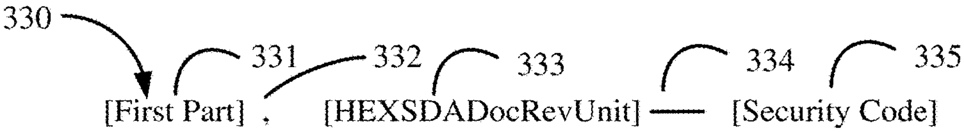
FIG. 3C schematically illustrates an embodiment of an engineering name template.

FIG. 3C schematically illustrates an embodiment of an engineering name template 330 for which the corresponding engineering name protocol specifies three segments 331, 333 and 335 and two syntax elements 332, 224. The first name segment 331 schematically illustrated in FIG. 3C is a place holder for a first part of an engineering name. The corresponding engineering name protocol specifies that a second name segment 333 is optional, so a user 292 has the option of specifying (or not) data to substitute into the template. In the example of FIG. 3C, the corresponding engineering name protocol specifies that a third name segment 335 must be a security code.

A user can create an engineering name that is compliant with the corresponding engineering name protocol by specifying data for the first segment 331, which data is of an allowable type pursuant the corresponding engineering name protocol, and by specifying a security code for the third segment 335, and by specifying, at the user's option, whether to include the optional segment 333. If the user specifies that the engineering name produced from the template 330 is to include the optional segment 333, then the user also specifies the data to complete the optional segment 333. The data supplied by the user for the first segment 331 and the third segment 335 and (at the user's option) for the optional segment 333 combines with the syntax elements 334 (and 333 if the name includes the optional element 333) in the form as shown in FIG. 3C.

Figure 3D:
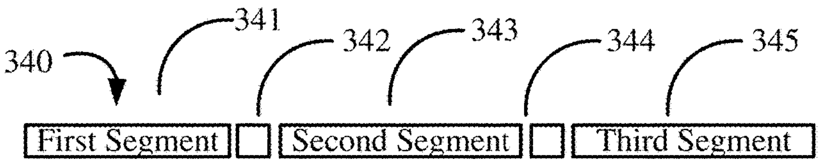
FIG. 3D schematically illustrates an embodiment of an engineering name template having fillable graphical devices for a graphical user interface.

FIG. 3D schematically illustrates an embodiment of an engineering name template 340 having fillable graphical devices 341, 342, 343, 344, and 345 for a graphical user interface. Graphical devices 341, 343 and 345 are graphical boxes into which a user can enter text that becomes part of an engineering name. Graphical devices 342 and 344 are boxes into which a user can enter a syntax element, such as a dash or a comma, for example. The text and syntax elements entered via the graphical user interface in of FIG. 3D combine to form an engineering name that complies with the corresponding engineering name protocol.

Figure 3E:
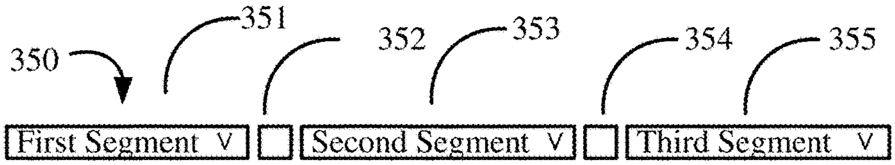
FIG. 3E schematically illustrates an embodiment of an engineering name template having selectable graphical devices for a graphical user interface.

FIG. 3E schematically illustrates an embodiment of an engineering name template 350 having selectable graphical devices 351, 352, 353, 354 and 355 for a graphical user interface.

Graphical devices 351, 353 and 355 are each a drop-down menu from which a user can select text that becomes part of an engineering name. The content of each such drop-down menu (i.e., the options from which the user can select) is specified by the corresponding engineering name protocol and provide to the graphical user interface from the metadata.

Graphical devices 352 and 354 are each a drop-down menu from which a user can select an available syntax element. The content of each such drop-down menu (i.e., the options from which the user can select) is specified by the corresponding engineering name protocol.

The text and syntax elements entered via the graphical user interface in of FIG. 3E combine to form an engineering name that complies with the corresponding engineering name protocol.

Figure 3F:
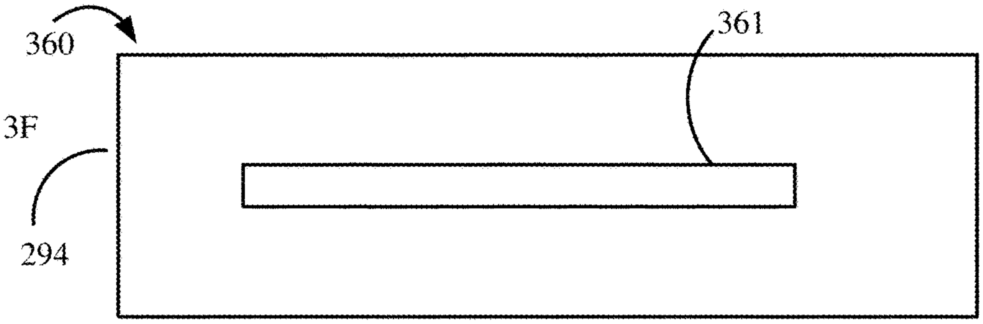
FIG. 3F schematically illustrates an embodiment of a graphical user interface for creating an engineering name template or engineering name.

FIG. 3F schematically illustrates an embodiment of a graphical user interface 360 for creating an engineering name template or engineering name. The graphical user interface 360 in this embodiment is schematically illustrated as displayed on an embodiment of a computer display 274. The graphical user interface 360 includes a template 361, which may be a template configured to solicit, from a user of the graphical user interface 360, information to create a protocol-compliant engineering name template, or a protocol-compliant engineering name, according to any of the examples disclosed herein.

Figure 4:
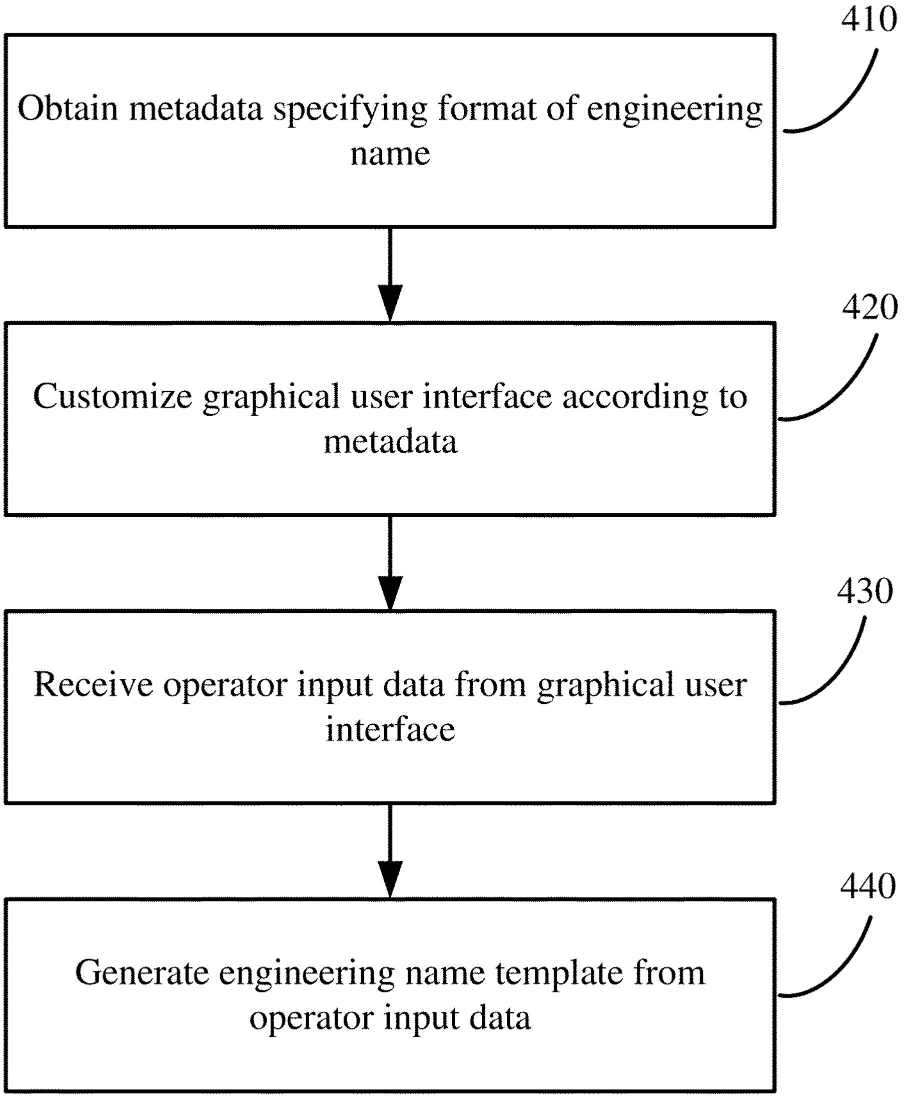
FIG. 4 schematically illustrates a flowchart of an embodiment of a method of generating an engineering name template.

FIG. 4 schematically illustrates a flowchart of an embodiment of a method of generating an engineering name template.

Step 410 includes obtaining metadata specifying inclusion, in a template, of a plurality of name segments of a multi-segment name, which name segments are specified by the specific engineering name protocol. In some embodiments, the metadata also specifies inclusion of syntax elements for the multi-statement name. Illustrative embodiments also specify a set of options for completing (or specifying or selecting the content of) each name segment and/or syntax element.

In some embodiments, options for completing (or specifying or selecting the content of) each name segment and/or syntax element are fixed by the protocol, and in other embodiments the options may be limited to a specific list options provided by the protocol. In some embodiments, options for completing (or specifying or selecting the content of) each name segment and/or syntax element allow free-form entry into a graphical device.

Taking template 310 of FIG. 3A as an example, associated metadata would specify that the template includes first segment 311, second segment 313, third segment 315, and fourth segment 317. The associated metadata would also specify inclusion of several syntax elements 312, 314 and 316, each between two of the segments.

Moreover, in some embodiments, the metadata provides options for specifying the content of each template segment, 311, 313, 315, and 317. For example, if the first segment 311 of the template requires the name of a city in which a company has an office, the metadata specifies a list of cities in which the company has an office. For example, if the company has an office in New York, an office in Chicago, and an office in Seattle, the metadata will specify a list of those cities as options for specifying the content. The template may be configured to display the first segment 311, and to present the list of cities as a drop-down menu, for example.

The metadata also specifies options for the content of each of the other segments 313, 315 and 317, and options for each of the syntax elements 312, 314 and 316.

Consequently, when a graphical user interface is customized with the content of each template segment, 311, 313, 315 and 317 and options for each syntax element 312, 314 and 316, the graphical user interface becomes, and is configured to be, a template for creating a protocol-compliant engineering name. That template enables a person 292 to create an engineering name, even when the person 292 is not familiar with the protocol.

Accordingly, in some embodiments, the metadata includes specification of the plurality of name segments, and the order of each such name segment within the engineering name template.

In some embodiments, the metadata includes specification of the plurality of name segments, a specified order of each such name segment within the engineering name template as well as syntax elements coupling the name segments in the specified order.

In some embodiments, the metadata specifies a set of options for each segment of the name segment; and each name segment of the engineering name template is in the form of a corresponding drop-down menu, which drop-down menu presents options for said name segment, which options are specified by the metadata.

In some embodiments, the metadata specifies a set of optional name segments.

In some embodiments, the metadata specifies a plurality of name segments, for which content may be specified by a user.

Step 420 includes customizing a graphical user interface 500 by populating a set of graphical input devices within the graphical user interface 500 with the metadata, such that the graphical user interface is configured to solicit and receive operator input data to develop an engineering name template.

Step 430 includes receiving operator input data from a template architect 282, received via the graphical user interface.

Step 440 includes (subsequent to receiving operator input data) generating the engineering name template pursuant to the operator input data, which engineering name template is configured to solicit information from a user 292 that, when populated into the engineering name template, produces an engineering name that complies with the specified engineering name protocol.

Figure 5A:
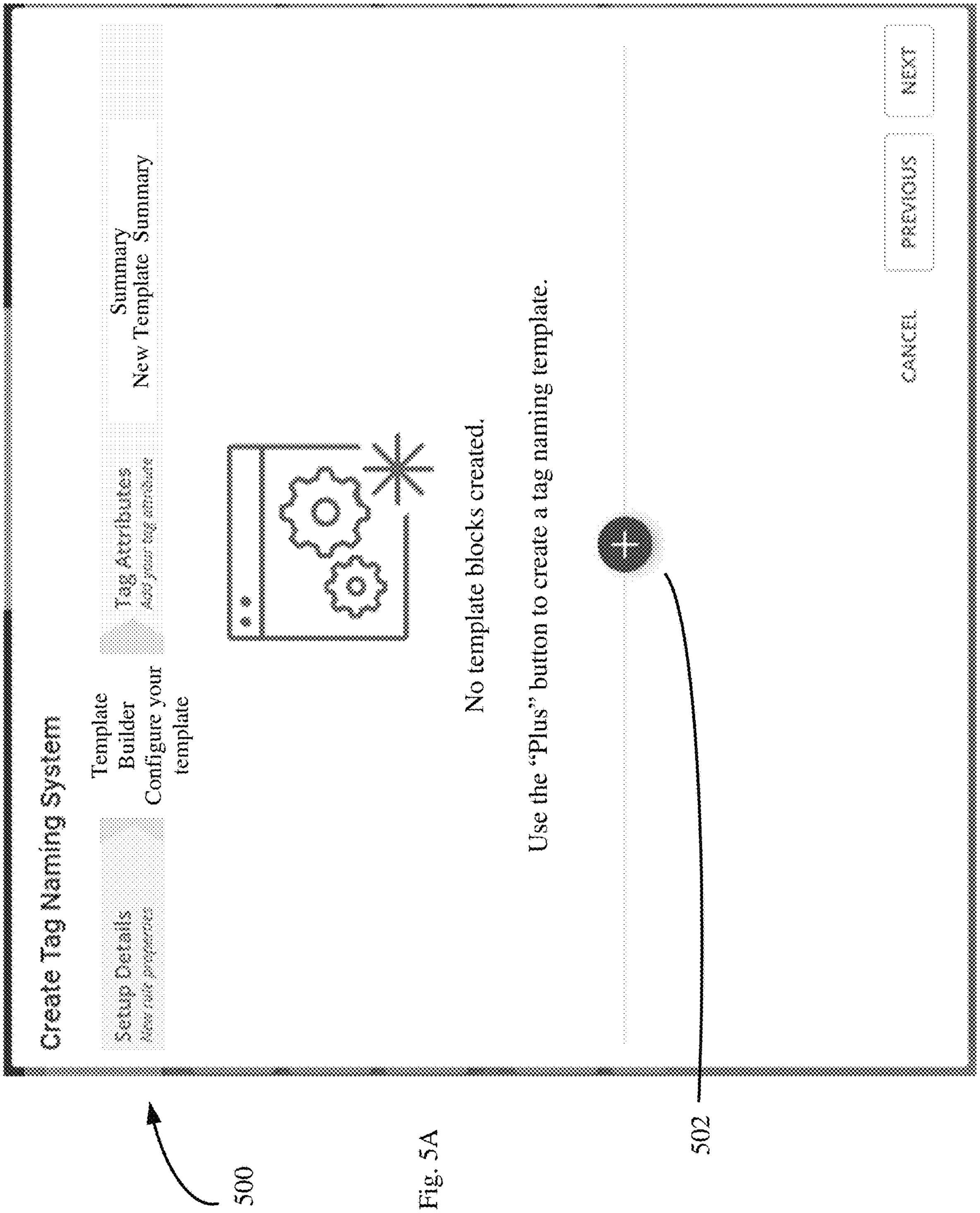
FIG. 5A schematically illustrates an embodiment of a screen of an embodiment of a graphical user interface.

FIG. 5A schematically illustrates an embodiment of a screen of an embodiment of an architect graphical user interface 500 for use in generating an engineering name template. In FIG. 5A, the architect graphical user interface indicates that a process of creating a template has not yet begun. A template architect 282 can begin the process of creating a template by using (e.g., clicking-on) an icon provided for that purpose, e.g., the "Plus" button 502.

Figure 5B:
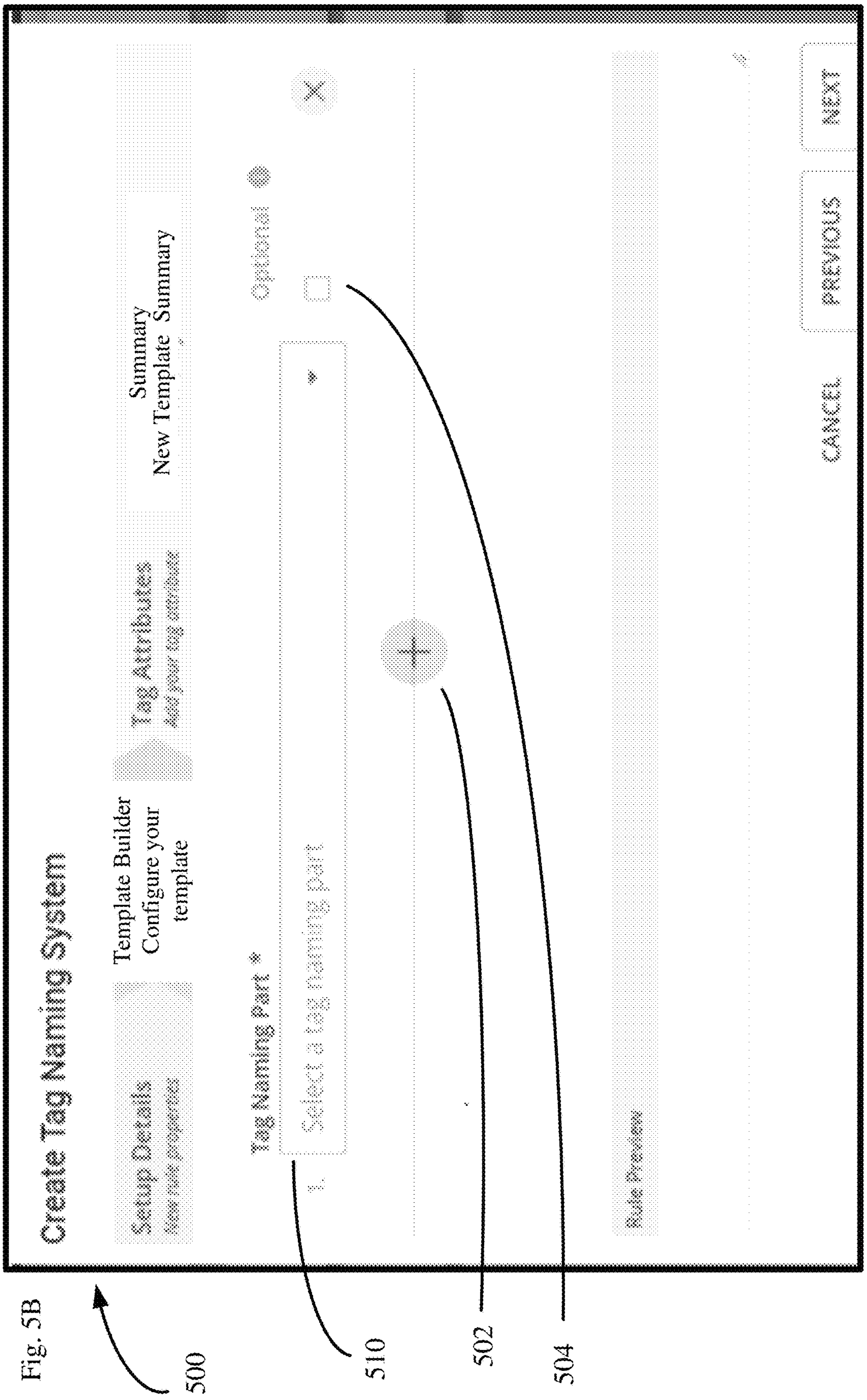
FIG. 5B schematically illustrates an embodiment of a screen of an embodiment of a graphical user interface.

In FIG. 5B, the architect graphical user interface 500 displays a first graphical device 510 soliciting input from a template architect using the architect graphical user interface 500 to specify a first segment (or "tag naming part") of a template. In illustrative embodiments, the fist segment is specified by a corresponding protocol, and is specified to the architect graphical user interface 500 by the metadata.

Figure 5C:
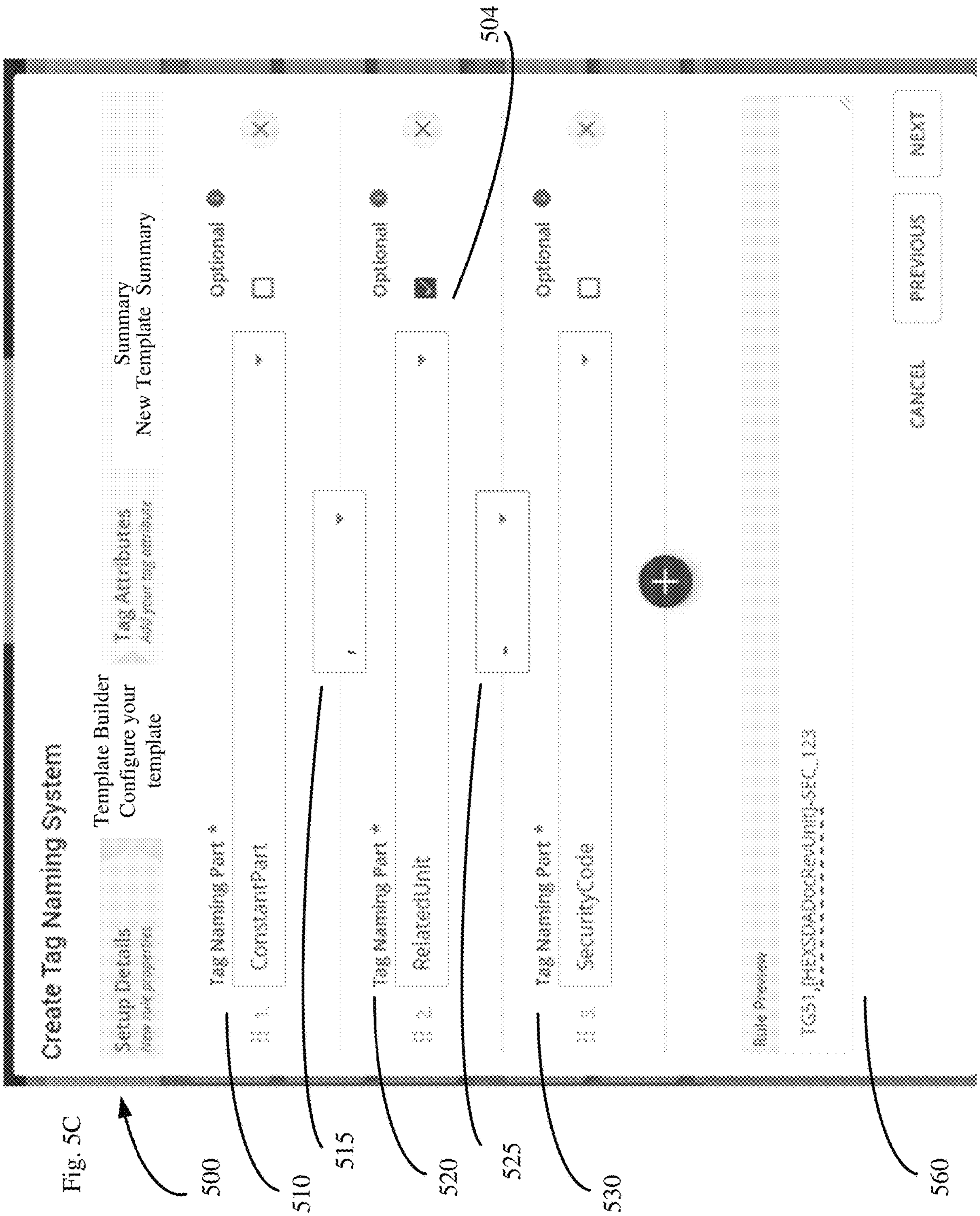
FIG. 5C schematically illustrates an embodiment of a screen of an embodiment of a graphical user interface.

The first graphical device 510 includes a menu (e.g., a drop-down menu) that provides the architect with a set of options for specifying a first part of the template. The set of options in the drop-down menu is provided from the metadata. For example, in FIG. 5B, the drop-down menu associated with first graphical device 510 includes "ConstantPart," and may include a set of additional options. In FIG. 5C, the architect has selected "ConstantPart" as the first part of the template that the architect is building.

Some embodiments, as in FIG. 5B, also include a graphical device (e.g., a check box) 510 that allows the template architect 282 to specify that the template segment associated with the first graphical device 510 is an optional template segment. Consequently, a user of the template 292 (once the template architect 282 has completed creation of the template), which user 292 is using the template to create a protocol-compliant engineering name, may elect to omit (i.e., not to include) the first template segment in said protocol-compliant engineering name.

FIG. 5C schematically illustrates an embodiment of a screen of an embodiment of an architect graphical user interface 500 after the architect has used the Plus button 502 to add a second tag naming part 520. The second tag naming part 520 second segment of the template, and is specified by the corresponding protocol. The second tag naming part 520 has an associated menu (e.g., a drop-down menu) that provides the architect with a set of options for specifying the second part of the template.

In FIG. 5C, the architect has specified that the second tag naming part 520 of the template is configured to solicit information referred-to as "RelatedUnit." Moreover, the template architect 282 has indicated that the second tag naming part 520 is optional, by use of element 504.

In FIG. 5C, the architect has used the Plus button 502 to add a third tag naming part 530. The third tag naming part 530 represents a corresponding third segment of the template, and is specified by the corresponding protocol. The third tag naming part 530 has an associated menu (e.g., a drop-down menu) that provides the architect with a set of options for specifying the third part of the template. In FIG. 5C, the architect has specified that the third tag naming part 530 of the template is configured to solicit information referred-to as "SecurityCode."

In the embodiment of FIG. 5C, the architect graphical user interface 500 also includes a first syntax element 515 displayed between the first tag naming part 510 and the second tag naming part 520. The inclusion of the first syntax element 515 in the template, and its position between the first tag naming part 510 and the second tag naming part 520, is specified by the protocol, and is specified to the architect graphical user interface 500 via the metadata. In some embodiments, the content of the first syntax element 515 is fixed, and defined by the protocol and is specified to the architect graphical user interface 500 via the metadata. In some embodiments, the first syntax element 515 has an associated menu (e.g., a drop-down menu) that provides the architect with a set of options for specifying the content of the first syntax element 515.

The embodiment of FIG. 5C also includes a second syntax element 525. The inclusion of the second syntax element 525 in the template, and its position between the second tag naming part 520 and the third tag naming part 530, is specified by the protocol, and is specified to the architect graphical user interface 500 via the metadata. In some embodiments, the content of the second syntax element 525 is fixed, and defined by the protocol and is specified to the architect graphical user interface 500 via the metadata. In some embodiments, the second syntax element 525 has an associated menu (e.g., a drop-down menu) that provides the architect with a set of options for specifying the content of the second syntax element 525.

In the embodiment of FIG. 5C, the architect graphical user interface 500 also includes a preview pane 560, configured to display a draft template that is under construction using the architect graphical user interface 500.

Figure 5D:
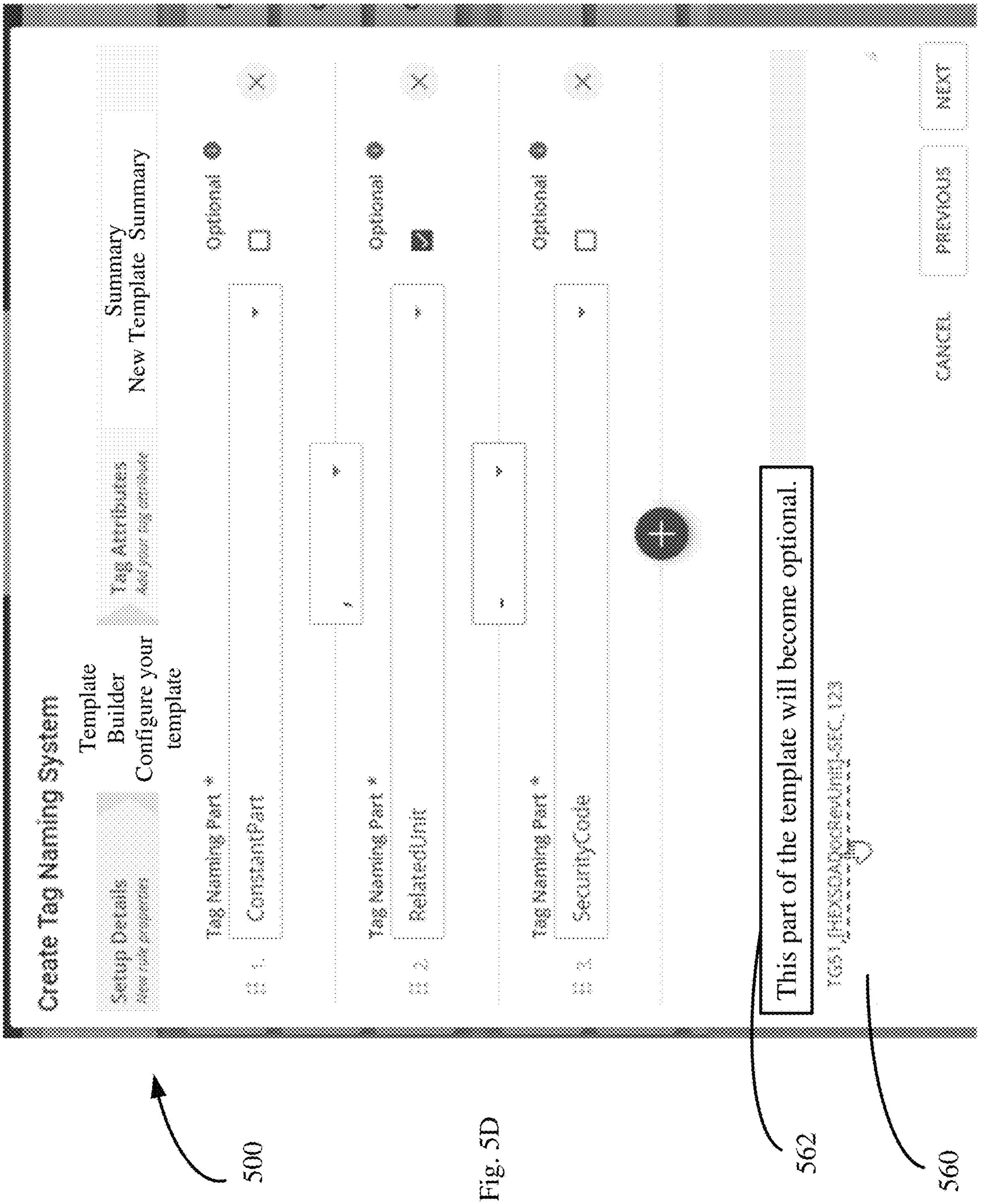
FIG. 5D schematically illustrates an embodiment of a screen of an embodiment of a graphical user interface.

Some embodiments of the preview pane 560 is also configured to display a note 562 to the architect, as schematically illustrated in FIG. 5D. The note 562 may indicate, point out, or confirm to the architect, a feature of the draft template displayed in the preview pane 560. Such a note 562 may point out to the architect an error in the draft template, or (as in FIG. 5D) may confirm to the architect that a given segment of the draft template has been specified as "optional."

Figure 5E:
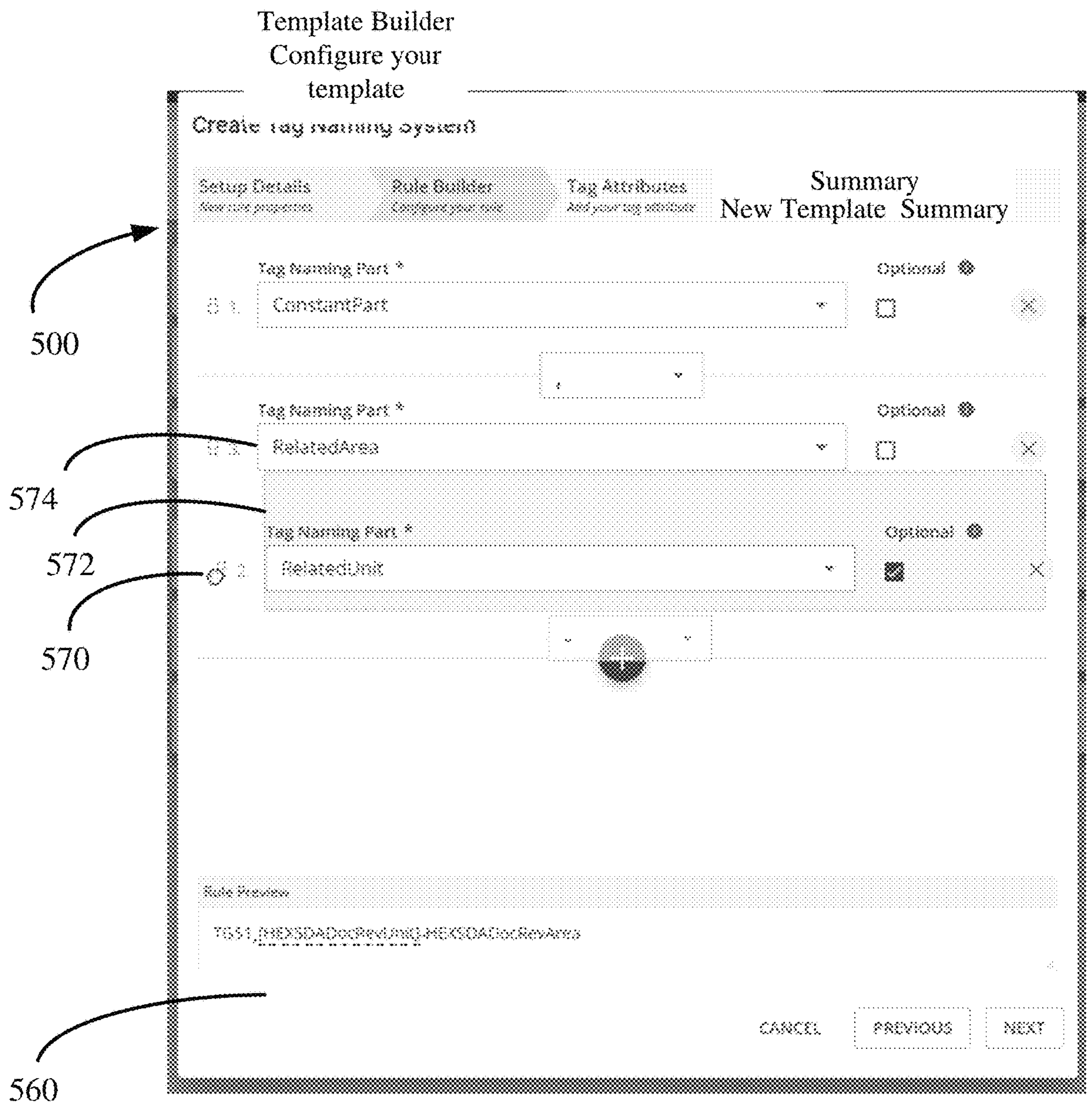
FIG. 5E schematically illustrates an embodiment of a screen of an embodiment of a graphical user interface.

FIG. 5E schematically illustrates an embodiment of a screen of an embodiment of a graphical user interface that allows structuring, or restructuring, of tag naming parts and/or syntax elements by dragging and dropping. In the embodiment of FIG. 5E, a template architect 282 may use a pointer 570, such as pointer controlled by a computer mouse for example, to select a tag naming element 572 and move it to (e.g., drag and drop it to) a different position within the graphical user interface 500 so that the position of the tag naming element 572 is changed, relative to a set of other tag naming elements, within the template. For example, in the embodiment illustrated in FIG. 5E, the template segment for "HEXSDADocRevUnit" is represented by tag naming part item 572, and is originally located before the template segment for "HEXSDADocRevArea" which is represented by tag naming part item 574, as shown in pane 560. In FIG. 5E, the template architect 282 has selected tag naming part item 572 and begun moving (dragging) tag naming part item 572 so that it will be placed (dropped) below tag naming part item 574, and so the template segment for "HEXSDADocRevUnit" will, after said dropping, follow the template segment for "HEXSDADocRevArea" in the template.

Figure 6:
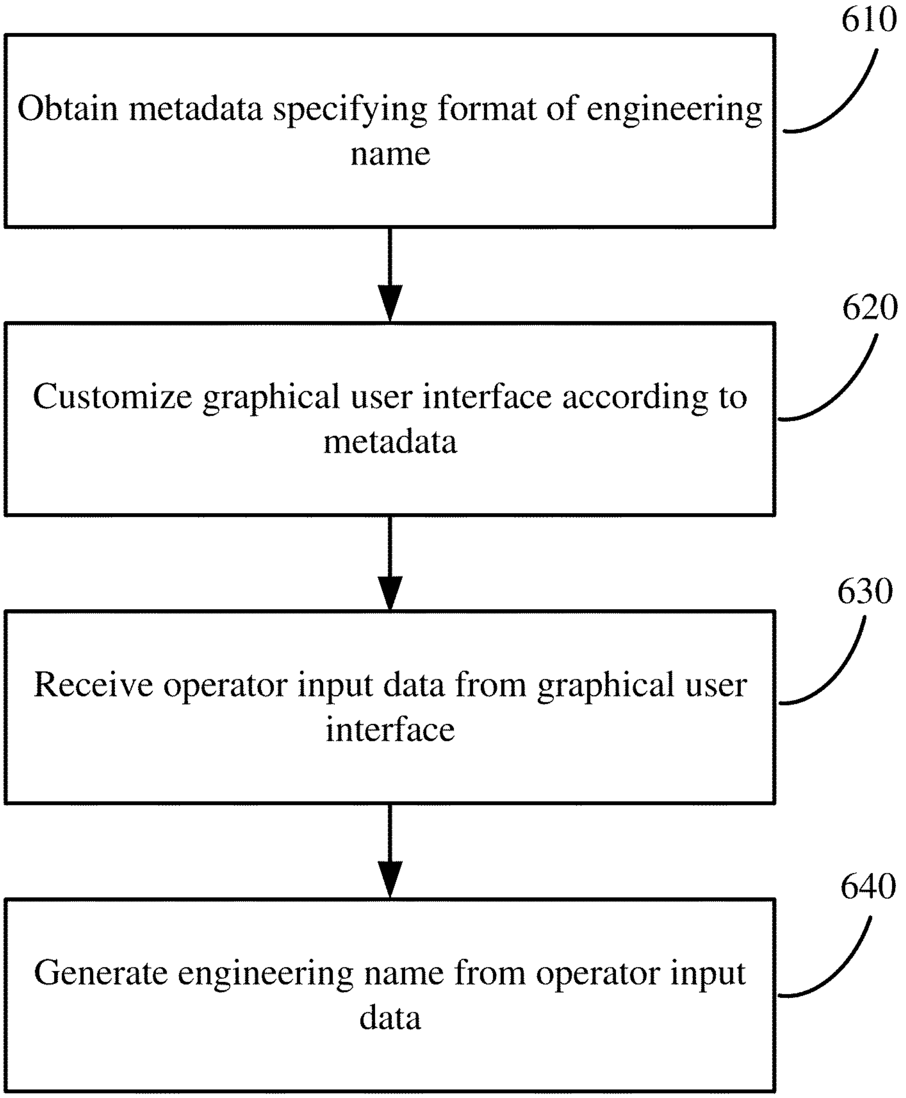
FIG. 6 schematically illustrates a flowchart of an embodiment of a method of generating an engineering name.

FIG. 6 schematically illustrates a flowchart of an embodiment of a method of generating an engineering name.

Step 610 includes obtaining metadata describing both content and syntax of a plurality of name segments of a multi-segment name, which content and syntax is specified by the specific engineering name protocol.

Step 620 includes customizing a graphical user interface by populating a set of graphical input devices within the graphical user interface with the metadata, such that the graphical user interface is configured to solicit and receive operator input data to develop an engineering name.

In some embodiments, steps 610 and 620 may be performed by acquiring an engineering name template, as described herein, for example in connection with FIG. 4.

Step 630 includes receiving operator input data, from a user 292, via the graphical user interface.

Step 640 includes (subsequent to receiving operator input data) generating the engineering name from the operator input data, which engineering name complies with the specified engineering name protocol.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. A computer-implemented method for populating name-generation template user interface for generating a naming template configured to produce an engineering name compliant with an associated naming protocol, each such name being a protocol-compliant name, the system including:

causing display, on a computer monitor, of a graphical user interface, the graphical user interface comprising:

a menu having a set of tag naming graphical devices, each tag naming graphical device configured to receive first architect input from a protocol architect specifying a first option defined by the naming protocol; and a set of delimiter graphical devices, each delimiter device associate with a pair of tag naming graphical devices and configured to receive second architect input from the architect specifying a delimiter defining a relationship between the pair of tag naming graphical devices; and a display window configured to display a draft naming template defined by the first architect input and second architect input received by said tag naming graphical devices and said delimiter graphical devices, said draft naming template configured to solicit user input from a user of the name-generation user interface to construct a protocol-compliant name.

P11. A method of creating an engineering name template for guiding a user to produce an engineering name, which engineering name complies with a specific engineering name protocol, the method comprising:

obtaining metadata describing both content and syntax of name segments of multi-segment names, which content and syntax is specified by the specific engineering name protocol;

customizing a graphical user interface ("GUI") by populating a set of graphical input devices within the GUI with information specified by the metadata, such that the GUI is configured to solicit and receive user input specifying a set of query options to develop an engineering name template;

receiving user input via the graphical user interface; and generating the engineering name template pursuant to the user input, which engineering name template is configured to solicit information from a user that, when populated into the engineering name template, produces an engineering name that complies with the specified engineering name protocol.

P21. A method of creating an engineering name that complies with a specific engineering name protocol, the method comprising:

obtaining metadata describing both content and syntax of name segments of multi-segment names that comply with the engineering name protocol;

customizing a graphical user interface ("GUI") by populating a set of graphical input devices within the GUI with information specified by the metadata, such that the GUI is configured to solicit and receive user input specifying a set of options to develop the engineering name;

receiving user input via the graphical user interface; and generating the engineering name as specified by the user input, which engineering name complies with the specific engineering name protocol.

P101. A computer-implemented method of creating an engineering name template for guiding a user to produce an engineering name, which engineering name complies with a specific engineering name protocol, the method comprising:

obtaining metadata describing both content and syntax of a plurality of name segments of a multi-segment name, which content and syntax is specified by the specific engineering name protocol;

obtaining a form graphical user interface, the generic graphical user interface having a plurality of graphical input devices which graphical user input devices are unpopulated with information configured to solicit operator input data;

customizing the form graphical user interface by populating the plurality of graphical input devices within the graphical user interface with the metadata, such that the graphical user interface is configured to solicit and receive operator input data to develop an engineering name template;

receiving operator input data via the graphical user interface; and generating the engineering name template as specified by the operator input data, which engineering name template is configured to solicit information from a user that, when populated into the engineering name template, produces an engineering name that complies with the specified engineering name protocol.

Various embodiments of this disclosure may be implemented at least in part in any conventional computer programming language. For example, some embodiments may be implemented in a procedural programming language (e.g., "C"), or in an object-oriented programming language (e.g., "C++"), or in Python, R, Java, LISP or Prolog. Other embodiments of this disclosure may be implemented as preprogrammed hardware elements (e.g., application specific integrated circuits, FPGAs, and digital signal processors), or other related components.

In an alternative embodiment, the disclosed apparatus and methods may be implemented as a computer program product for use with a computer system. Such implementation may include a series of computer instructions fixed either on a tangible medium, such as a non-transitory computer readable medium (e.g., a diskette, CD-ROM, ROM, FLASH memory, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of this disclosure may be implemented as a combination of both software (e.g., a computer program product) and hardware. Still other embodiments of this disclosure are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A computer-implemented method of creating an engineering name template for guiding a user to produce an engineering name, which engineering name complies with a specific engineering name protocol, the method comprising:

obtaining metadata describing both content and syntax of a plurality of name segments of a multi-segment name, which content and syntax is specified by the specific engineering name protocol;

customizing a graphical user interface to create a customized graphical user interface by populating a set of graphical input devices within the graphical user interface with the metadata, such that the customized graphical user interface is configured to solicit operator input data to develop an engineering name template;

receiving operator input data via the customized graphical user interface; and generating the engineering name template as specified by the operator input data, which engineering name template is configured to solicit information from a user that, when populated into the engineering name template, produces an engineering name that complies with the specific engineering name protocol.

2. The computer-implemented method of claim 1, wherein the metadata comprises:

specification of the plurality of name segments, and the order of each such name segment within the engineering name template; and the graphical user interface comprises a plurality of graphical input devices, each such graphical input device corresponding to a corresponding name segment from the plurality of name segments; and customizing a graphical user interface comprises arranging the graphical input devices in the order of said name segments within the engineering name template.

3. The computer-implemented method of claim 1, wherein:

the metadata comprises:

specification of the plurality of name segments, a specified order of each such name segment within the engineering name template; and syntax elements coupling the name segments in the specified order;

the graphical user interface comprises a plurality of graphical input devices, each such graphical input device corresponding to a corresponding name segment from the plurality of name segments; and customizing a graphical user interface comprises arranging the graphical input devices and the syntax elements in the specified order within the engineering name template.

4. The computer-implemented method of claim 1, wherein the engineering name template is in the form of text.

5. The computer-implemented method of claim 1, wherein:

the metadata specifies a set of options for each segment of the engineering name template; and each name segment of the engineering name template is in the form of a corresponding drop-down menu, which drop-down menu presents options for said name segment, which options are specified by the metadata.

6. The computer-implemented method of claim 1, wherein:

the metadata specifies a set of optional name segments; and customizing a graphical user interface comprises configuring to the customized graphical user interface to display optional name segments.

7. The computer-implemented method of claim 1, wherein:

the metadata specifies a plurality of name segments, for which content may be specified by a user; and the metadata specifies a set of syntax elements for which content may not be changed by a user; and customizing the graphical user interface comprises configuring the customized graphical user interface to provide name segments such that content of said name segments may be specified by a user.

8. An apparatus for creating an engineering name template for guiding a user to produce an engineering name, which engineering name complies with a specific engineering name protocol, the apparatus comprising:

a metadata module configured to obtain metadata describing both content and syntax of a plurality of name segments of a multi-segment name, which content and syntax is specified by the specific engineering name protocol;

a graphical user interface module configured to customize a graphical user interface by populating a set of graphical input devices within the graphical user interface with the metadata, such that the graphical user interface is configured to solicit and receive operator input data to develop an engineering name template;

an operator input module configured to receive operator input data via the graphical user interface; and a template generating module configured to generate the engineering name template pursuant to the operator input data, which engineering name template is configured to solicit information from a user that, when populated into the engineering name template, produces an engineering name that complies with the specified engineering name protocol.

9. The apparatus of claim 8:

wherein the metadata comprises specification of the plurality of name segments, and the order of each such name segment within the engineering name template; and the graphical user interface module is configured to customize the graphical user interface by arranging the set of graphical input devices to correspond with the order of the name segments within the engineering name template.

10. The apparatus of claim 8:

wherein the metadata comprises:

specification of the plurality of name segments, a specified order of each such name segment within the engineering name template, and syntax coupling the name segments in the specified order; and the graphical user interface module is configured to customize the graphical user interface by arranging the set of graphical input devices to correspond with the order of the name segments within the engineering name template along with syntax coupling the name segments in the specified order.

11. The apparatus of claim 8:

wherein the metadata specifies a set of options for each segment of the engineering name template; and the graphical user interface module is configured to customize the graphical user interface to present each name segment of the engineering name template in the form of a corresponding drop-down menu, which drop-down menu presents options for said name segment, which options are specified by the metadata.

12. The apparatus of claim 8:

wherein the metadata specifies a set of optional name segments; and the graphical user interface module is configured to customize the graphical user interface to display each optional name segment in response to operator input data.

13. The apparatus of claim 8:

wherein the metadata specifies a plurality of name segments, for which content may be specified by a user; and the metadata specifies a set of fixed syntax elements for which content may not be changed by a user; and the graphical user interface module is configured to customize the graphical user interface to display the plurality of name segments and the set of fixed syntax elements in an order specified by the metadata.

14. A non-transitory computer-readable medium having computer executable code thereon, the computer executable code, when executed by a computer system, causing the computer system to perform a method, the code comprising:

code for obtaining metadata describing both content and syntax of a plurality of name segments of a multi-segment name, which content and syntax is specified by a specific engineering name protocol;

code for customizing a graphical user interface to create a customized graphical user interface by populating a set of graphical input devices within the graphical user interface with the metadata, such that the graphical user interface is configured to solicit and receive operator input data to develop an engineering name template;

code for displaying the customized graphical user interface on a computer display;

code for receiving operator input data via the customized graphical user interface; and code for generating the engineering name template pursuant to the operator input data, which engineering name template is configured to solicit information from a user that, when populated into the engineering name template, produces an engineering name that complies with the specific engineering name protocol.

15. The non-transitory computer-readable medium of claim 14, wherein:

the metadata comprises specification of the plurality of name segments, and the order of each such name segment within the engineering name template; and wherein the code for customizing a graphical user interface comprises code for graphically arranging the set of graphical input devices to correspond with the order of the name segments within the engineering name template.

16. The non-transitory computer-readable medium of claim 14, wherein:

the metadata comprises:

specification of the plurality of name segments, a specified order of each such name segment within the engineering name template, and syntax coupling the name segments in the specified order; and the code for customizing a graphical user interface comprises code for customizing the graphical user interface by arranging the set of graphical input devices to correspond with the order of the name segments within the engineering name template along with syntax coupling the name segments in the specified order.

17. The non-transitory computer-readable medium of claim 14, wherein:

the metadata comprises:

a set of options for each segment of the engineering name template; and the code for customizing a graphical user interface comprises code for displaying each name segment of the engineering name template in the form of a corresponding drop-down menu, which drop-down menu presents options for said name segment, which options are specified by the metadata.

18. The non-transitory computer-readable medium of claim 14 wherein:

the metadata comprises specification of a set of optional name segments; and the code for customizing a graphical user interface comprises code for customizing the graphical user interface to display each optional name segment in response to operator input data.

19. The non-transitory computer-readable medium of claim 14, wherein:

the metadata specifies:

a plurality of name segments, for which content may be specified by a user, and a set of fixed syntax elements for which content may not be changed by a user; and the code for customizing a graphical user interface comprises code for customizing the graphical user interface to display the plurality of name segments and the set of fixed syntax elements in an order specified by the metadata.

20. The non-transitory computer-readable medium of claim 14, wherein the code further comprises:

code for causing display, on a computer screen, a preview of the template.

* * * * *